United States Patent [19]

Farrenkopf et al.

[11] Patent Number: 4,793,542

[45] Date of Patent: Dec. 27, 1988

[54] PROCESS FOR WELDING CAST IRON

[75] Inventors: Wolfgang Farrenkopf, Friedberg/Staetzling; Heinrich Gruenauer, Augsburg; Manfred Menzinger, Kissing; Joachim von Hirsch, Schwerte; Reinhard Opitz, Dortmund, all of Fed. Rep. of Germany

[73] Assignees: Walter Hundhausen GmbH & Co. KG, Schwerte; KUKA Schweissanlangen + Roboter GmbH, Augsburg, both of Fed. Rep. of Germany

[21] Appl. No.: 138,050

[22] Filed: Dec. 28, 1987

[30] Foreign Application Priority Data

Dec. 27, 1986 [DE] Fed. Rep. of Germany ....... 3644577

[51] Int. Cl.$^4$ .............................................. B23K 20/12
[52] U.S. Cl. .................................... 228/112; 228/114; 228/263.14
[58] Field of Search ............................... 228/112–114, 228/263.14, 263.15, 2

[56] References Cited

FOREIGN PATENT DOCUMENTS 912447 3/1982 U.S.S.R. ............................. 228/112
1204344 1/1986 U.S.S.R. ............................. 228/114

OTHER PUBLICATIONS

DVS (German Welding Engineering Association); Instruction Sheet 2909, Part 1; (Mar. 1980).
Schweissen Und Schneiden (1985), Heft 2; pp. 60–65; Prof. Dr.-Ing. Helmut Richter and Dipl.-Ing. Alfred Palzkill, Wuppertal.
Konstruieren + Giessen 11 (1962) Nr. 2; pp. 33–37; H. Richter and A. Palzkill.

Primary Examiner—Nicholas P. Godici
Assistant Examiner—Samuel M. Heinrich
Attorney, Agent, or Firm—Foley & Lardner, Schwartz, Jeffery, Schwaab, Mack, Blumenthal & Evans

[57] ABSTRACT

An improved friction-welding process for effecting a joint between steel and nodular graphite-containing cast iron by using (i) a short friction-generating time so as to minimize diffusion of carbon into steel and (ii) an elevated forging pressure so as to effect a quantitative ejection of carburized melt but avoid formation of a weld laminate, is provided, as well as a nodular graphite-containing cast iron of grade 40.3 S, suitable for use in friction-welding and comprising about 280–320 graphite nodules per mm$^2$, 280–300 ferrite grains per mm$^2$ and a spherulite proportion of about at least 95% by weight of the graphite precipitations.

10 Claims, No Drawings

PROCESS FOR WELDING CAST IRON

BACKGROUND OF THE INVENTION

This invention relates to a process for friction-welding steel to cast iron that contains nodular graphite, comprising the steps of (a) generating a relative movement, by rotation, between contacting surfaces of parts to be joined, (b) pressing the parts to be joined against each other along their contacting surfaces during the generation of relative movement (i.e., at a frictional pressure), and (c) pressing the parts to be joined during a subsequent stationary period at an elevated pressure (i.e., at a forging pressure).

According to DVS (German Welding Engineering Association) instruction sheet 2909 part 1 (March 1980), a distinction is made between friction-welding with continuous drive, friction-welding with inertia drive and a combined friction-welding (hybrid friction-welding). In the case of the last variant, rotary speed, frictional force per unit area, frictional time/frictional path, braking instant, forging instant, forging force per unit area and forging time emerge as main welding parameters.

In essays by Professor Dr. H. Richter and Dipl.-Ing. A. Palzkill in *Schweissen und Schneiden* 37: 60–65 (1985) ("Übertragung von Mikroreibschweissversuchen auf bauteilgrosse Proben am beispiel der Werkstoffkombination Baustahl/Gausseisen mit Kugelgraphit") ["Extrapolation of micro-friction welding experiments to component-size samples based on the example of the material combination comprising structural steel/cast iron containing nodular graphite"] and in *Konstruieren und Giessen* 11: 33–37 (1986) ("Friction welding of steel to cast iron containing nodular graphite"), a friction-welding process is described, substantially as below:

The process of friction-welding is based on heat development generated by friction between contacting surfaces of work-pieces to be joined. For this purpose, in addition to application of a relative rotary movement to generate friction, pressure is applied. Within the context of the present invention, the step at which friction is generated is otherwise referred to as a frictional process, the period during which friction is generated is otherwise referred to as frictional time, and the pressure applied during the frictional process is otherwise referred to as frictional pressure. The frictional process proceeds within a time period of fractions of a second to a few seconds so that heat generated at a point of contact results in temperatures of up to approximately the melting point of one of the workpieces. The contacting surfaces become highly plastic during this process and are, in general, displaced out of the welding zone under the action of frictional force so that a flash is formed. In the welding zone itself, atomic structures of the contacting surfaces are brought into close contact during this frictional process such that elementary binding forces become effective. The correct combined action of rotary speed or frictional velocity, frictional force, possibly forging force at the end of the frictional process, and also the frictional time are decisive for success of a welded joint. In friction-welding combination of steel and graphite-containing cast iron, action of graphite from the cast iron on the weld must also be taken into account, because this graphite builds up a lubricating layer, which layer impedes generation of an intensive frictional force and, consequently, development of heat.

Based upon these publications, it appears that a bearing joint of steel and cast iron that contains nodular graphite can be made by friction welding, but this process would result in a weld interface structure and a weld point that are characterized by a change in graphite formation and in basic structure of the joint. Although such joints exhibit metallurgically satisfactory bonding zones, they do not adequately resist mechanical loads.

SUMMARY OF THE INVENTION

It is, therefore, an object of the present invention to improve upon existing methods of effecting a joint between steel and nodular graphite-containing cast iron, such that the joint exhibits a metallurgically satisfactory bond.

It is another object of the present invention to provide a method of effecting a joint as described above, such that the joint adequately resists mechanical loads.

It is a yet another object of the present invention to provide a nodular graphite-containing cast iron suitable for use in effecting a joint as described above, between said cast iron and steel.

In accomplishing these and other objects, there has been provided in accordance with one aspect of the present invention, a process for friction-welding steel to nodular graphite-containing cast iron, comprising the steps of (a) generating a relative movement between contacting surfaces of parts to be joined by rotation for a period of time, (b) pressing said parts against each other along their contacting surfaces during rotation at a frictional pressure, and (c) pressing said parts during a subsequent stationary period at a forging pressure, to produce a friction-welded joint, wherein (i) said period of time is such that carbon diffusion into steel is minimized in region of the friction-welded joint, and (ii) said forging pressure is elevated such that a quantitative ejection of a carburized melt results, but a weld laminate of graphite nodules in a lamella is avoided.

In accordance with another aspect of the present invention, there has been provided a process as described above, wherein said cast iron is of grade 40.3 S and has a structural constitution comprising about 280–320 graphite nodules per $mm^2$; about 280–300 ferrite grains per $mm^2$, and a spherulite proportion of at least 95% of the total graphite precipitations.

In a preferred embodiment, the frictional pressure is about 22 bar, the forging pressure is about 86 bar and the period of time is about 40 seconds.

In accordance with yet another aspect of the present invention, said cast iron is produced in a process that comprises magnesium treatment of a melt composition which comprises about 0.01%–0.25% Mn, 0.01%–0.05% Cr, 0.02%–0.05% Cu, 0.01%–0.02% P, 0.001%–0.02% S, and up to about 0.15% of at least one carbide-stabilizing trace element, wherein the percentages are by weight of melt composition.

In accordance with still another aspect of the present invention, there has been provided a nodular graphite-containing cast iron suitable for use in friction-welding, comprising about 280–320 graphite nodules per $mm^2$, about 280–300 ferrite grains per $mm^2$, and a spherulite proportion of at least 95% by weight of total graphite precipitation.

In accordance with a further aspect of the present invention, there has been provided a nodular graphite-containing cast iron as described above, wherein said cast iron is produced in a process of magnesium treatment of a melt composition that comprises about 0.01%–0.25% Mn, 0.01%–0.05% Cr, 0.02%–0.05% Cu, 0.01%–0.02% P, 0.001%–0.02% S, and up to 0.15% of at least one carbide-stabilizing trace element, and said percentages are by weight of melt composition.

Further objects, features and advantages of the present invention will become apparent from the following detailed description. It should be understood, however, that the detailed description and specific example, while indicating preferred embodiments of the invention, are given by way of illustration only, since various changes and modification within the spirit and scope of the invention will become apparent to those skilled in the art from this detailed description.

DETAILED DESCRIPTION OF PREFERRED EMBODIMENTS

The invention is based on the object of improving existing friction-welding processes, such that a defect-free bearing joint can be reproducibly achieved between steel and cast iron that contains nodular graphite, in a large scale application of a friction-welding process.

In one embodiment of the present invention, there has been provided a process for friction-welding steel to cast iron that contains nodular graphite, comprising generating a relative movement, by rotation, between contacting surfaces of parts to be joined, and pressing the parts against each other along their contacting surfaces and, in particular, both during the generation of relative movement (at a frictional pressure) and also at a higher pressure during the subsequent stationary period (at a forging pressure), wherein said process is improved by implementation of the following features:

(a) Use of a cast iron that contains nodular graphite of grade 40.3 S, with a structural constitution that comprises 280–320 graphite nodules per $mm^2$, 280–300 ferrite grains per $mm^2$, and a spherulite proportion of at least 95% of the total graphite precipitations;

(b) Adjustment of frictional time so that diffusion of carbon into steel is minimized in region of a friction-welded joint;

(c) Selection of a high forging pressure such that a quantitative ejection of carburized melt results from the friction-welding process but a weld laminate of graphite nodules into lamellae is avoided.

This invention is based upon the recognition that disadvantages of welding steel to nodular graphite-containing cast iron, observed hitherto, are to be attributed, inter alia, to crushing of the nodular graphite in the cast iron. According to the present invention, therefore, efforts are made to find parameters that would prevent said weld laminating but at the same time would result in a strength of the welded joint which corresponds to that of a basic steel-cast iron material.

The invention is further based upon the recognition that the cause of restricted tendency to friction-welding results from dissolution of carbon. Dissolution of carbon results from frictional heat generated and leads, as a result of the rapid heat removal via the work-piece, to ledeburite and martensite formation and, consequently, to severe material embrittlement. Imperfect workpiece machining such as lack of ductility and stress crack formation in the work-pieces are the consequences of embrittlement. Furthermore, it has been discovered that the cast iron compositions conventionally used may contain embrittling elements that can cause crack formation and material damage immediately after friction-welding.

The necessity of a heat treatment in conventional friction-welding process makes the process expensive. Furthermore, in such a process stress cracks of primary origin, i.e., cracks appearing directly after friction-welding, cannot be removed. From this emerges a requirement for ledeburite-free production of the load-bearing cross-section of a friction-welded joint that can be effected without subsequent heat treatment. It is therefore, an object of the present invention to develop a cast iron material containing nodular graphite for use as a suitable material for friction-welding, so that structural changes that impair quality, such as formation of ledeburite or martensite due to the effect of heat generated in friction-welding, are avoided.

The grade 40.3 S (S for "suitable for welding") nodular graphite-containing cast iron, according to the present invention, is a further development of the ferritic material GGG-40.3 conventionally used. This GGG-40.3 material has been standardized as specified in DIN 1693 and is characterized by defined tenacity properties.

Embrittling elements within the context of the present invention are manganese, chromium copper, and also phosphorous, sulfur and trace elements. In the production of the cast iron according to one embodiment of the present invention, a melt composition before a magnesium treatment that forms nodular graphite preferably comprises about 0.01%–0.25% Mn
about 0.01%–0.05% Cr
about 0.02%–0.05% Cu
about 0.01%–0.02% P
about 0.001%–0.02% S and a total concentration of up to 0.15% of carbide-stabilizing trace elements such as bismuth, tin, selenium, tellurium, antimony, molybdenum, vanadium, and titanium.

It is known that the element silicon is present as an alloy in ferrite, and as the content of silicon increases therein, embrittlement results. On the other hand, silicon is an important alloying element for promoting carbon precipitation during solidification and, consequently, for avoiding a cementitic or ledeburitic structural constitution. To ensure low silicon content with optimum stable eutectic solidification, the following process engineering steps are preferred in one embodiment of the present invention:

To promote graphite crystallization, the carbon content in the melt is preferably adjusted to between 3.75% and 3.85% by weight. The silicon content of the basic melt is preferably adjusted to between 2.14% and 2.16%, and a two-stage inoculation of the melt up to final content of 2.30%±0.10% can be advantageously carried out. Furthermore, to minimize tendency to supercooling due to the process and, consequently, to avoid carbidic solidification, treatment with pure magnesium in a GF converter is advantageously adjusted to 0.045%±0.005% Mg.

As a result of the melt composition and of the methods of treating the melt in accordance with the present invention, properties which substantially match properties of steel and, consequently, fulfil the basic requirement for a uniform material behavior after friction-welding, are obtained for the material type GGG-40.3 S.

In a preferred embodiment of the present invention, a new material type can be developed and preferably used in conjunction with adjustments in the process parameters that are of essential for friction-welding. As a result of shortening the hitherto conventional frictional time, the carbon diffusion into the steel can be minimized in the region of the friction-welded joint. As a result of increasing the hitherto conventional forging pressure, a quantitative ejection of the carburized melt from the friction-welding process and, consequently, elimination of ledeburritic or martensitic structures is obtained. At the same time, the forging pressure can be adjusted to a level such that formation of lamellae by weld lamination of graphite nodules is avoided. The present invention is further described below by reference to the following example:

EXAMPLE 1

A nodular graphite-containing cast iron, according to the present invention, of grade 40.3 S, that has a structural constitution as described above was made. The mechanical material properties of this grade are compared to corresponding properties of the material specified in DIN 1693, as shown in Table 1.

TABLE I

| | Mechanical material properties of GGG-40.3 S | | | | | | | | | |
|---|---|---|---|---|---|---|---|---|---|---|
| Welding Grade* | Tensile strength $R_m$ (N/mm$^2$) | Yield point $R_p$ (N/mm$^2$) | Elongation $A_5$ (%) | Hardness (HB) | Impact energy (DVM**) AV (J) | | | | | |
| | | | | | +20 | 0 | −20 | −40 | −60 | −80° C. |
| X | 420 | 297 | 25.4 | 158 | 19 | 19 | 17 | 13 | 8 | 5 |
| S | 5.1 | 4.0 | 1.5 | 3.4 | 0.8 | 1.0 | 1.0 | 1.2 | 1.5 | 1.5 |
| max | 434 | 305 | 28.3 | 165 | 20 | 19 | 19 | 15 | 10 | 6 |
| min | 409 | 287 | 20.7 | 150 | 15 | 15 | 14 | 13 | 6 | 4 |
| DIN 1693 | 400 | 250 | 18 | | | | | 14 | | |

Number of samples n = 115 (3.06 to 9.10.86)
*Determined on Y samples as specified in DIN 1693
**DVM = German Material Testing Association

What is claimed is:

1. A process for friction-welding steel to nodular graphite-containing cast iron, comprising the steps of
    (a) generating a relative movement between contacting surfaces of parts to be joined by rotation for a period of time,
    (b) pressing said parts against each other along their contacting surfaces during rotation at a frictional pressure, and
    (c) pressing said parts during a subsequent stationary period, at a forging pressure, to produce a friction-welded joint, wherein
        (i) said cast iron is of grade 40.3 S and has a structural constitution comprising about 280–320 graphite nodules per mm$^2$, about 280–300 ferrite grains per mm$^2$, and a spherulite proportion of at least 95% of total graphite precipitation,
        (ii) said period of time is such that carbon diffusion into steel is minimized in region of the friction-welded joint, and
        (iii) said forging pressure is elevated such that a quantitative ejection of a carburized melt results, but a weld laminate of graphite nodules in a lamella is avoided.

2. A process according to claim 1, wherein said frictional pressure is about 22 bar.

3. A process according to claim 1, wherein said forging pressure is about 86 bar.

4. A process according to claim 1, wherein said period of time is about 40 seconds.

5. A process according to claim 1, wherein said cast iron is produced in a process that comprises magnesium treatment of a melt composition which comprises about 0.01%–0.25% Mn, 0.01%–0.05% Cr, 0.02%–0.05% Cu, 0.01%–0.02% P, 0.001%–0.02% S, and up to about 0.15% of at least one carbide-stabilizing trace element, wherein the percentages are by weight of melt composition.

6. A process according to claim 5, wherein said trace element is bismuth, tin, selenium, tellurium, antimony, molybdenum, vanadium, or titanium.

7. A process according to claim 5, wherein said melt further comprises a carbon content of between about 3.75% and 3.85% by weight.

8. A process according to claim 5, wherein said melt further comprises a silicon content of between about 2.14% and 2.16% by weight.

9. A process according to claim 5, wherein said melt is inoculated in a two-stage process and is further comprised of a silicon content of between about 2.20% and 2.40% by weight.

10. A process according to claim 5, wherein said magnesium treatment comprises treatment with between about 0.040% and 0.050% by weight of pure magnesium in a GF converter.

* * * * *